United States Patent
Lee et al.

(10) Patent No.: US 12,099,869 B2
(45) Date of Patent: Sep. 24, 2024

(54) LAYER-WISE SCHEDULING ON MODELS BASED ON IDLE TIMES

(71) Applicants: Samsung Electronics Co., Ltd, Suwon-si (KR); SNU R&DB FOUNDATION, Seoul (KR)

(72) Inventors: Seung Wook Lee, Suwon-si (KR); Younghwan Oh, Seoul (KR); Jaewook Lee, Seoul (KR); Sam Son, Bucheon-si (KR); Yunho Jin, Seoul (KR); Taejun Ham, Seoul (KR)

(73) Assignees: Samsung Electronics Co., Ltd., Suwon-si (KR); SNU R&DB FOUNDATION, Seoul (KR)

( * ) Notice: Subject to any disclaimer, the term of this patent is extended or adjusted under 35 U.S.C. 154(b) by 664 days.

(21) Appl. No.: 17/195,748

(22) Filed: Mar. 9, 2021

(65) Prior Publication Data
US 2022/0114015 A1   Apr. 14, 2022

(30) Foreign Application Priority Data

Oct. 14, 2020   (KR) .................. 10-2020-0132759

(51) Int. Cl.
*G06F 9/48* (2006.01)
*G06F 9/50* (2006.01)

(52) U.S. Cl.
CPC .......... *G06F 9/4881* (2013.01); *G06F 9/5038* (2013.01); *G06F 9/505* (2013.01)

(58) Field of Classification Search
CPC ....... G06F 9/4881; G06F 9/5038; G06F 9/505
See application file for complete search history.

(56) References Cited

U.S. PATENT DOCUMENTS

| | | | | |
|---|---|---|---|---|
| 5,293,620 | A | * | 3/1994 | Barabash ............. G06F 9/4881 718/102 |
| 7,634,776 | B2 | * | 12/2009 | Parameswaran .... G06F 15/7842 712/201 |
| 8,856,777 | B2 | | 10/2014 | Sundarrajan et al. |
| 10,175,980 | B2 | | 1/2019 | Temam et al. |

(Continued)

FOREIGN PATENT DOCUMENTS

| KR | 10-2020-0020366 A | 2/2020 |
|---|---|---|
| KR | 10-2020-0062323 A | 6/2020 |

(Continued)

OTHER PUBLICATIONS

Baek, et al. "A multi-neural network acceleration architecture." *2020 ACM/IEEE 47th Annual International Symposium on Computer Architecture (ISCA)*. IEEE, May 30-Jun. 3, 2020. pp. 940-953.

(Continued)

*Primary Examiner* — Benjamin C Wu
(74) *Attorney, Agent, or Firm* — NSIP Law

(57) ABSTRACT

A scheduler, a method of operating the scheduler, and an electronic device including the scheduler are disclosed. The method of operating the scheduler configured to determine a model to be executed in an accelerator includes receiving one or more requests for execution of a plurality of models to be independently executed in the accelerator, and performing layer-wise scheduling on the models based on an idle time occurring when a candidate layer which is a target for the scheduling in each of the models is executed in the accelerator.

21 Claims, 10 Drawing Sheets

(56) References Cited

U.S. PATENT DOCUMENTS

| | | | |
|---|---|---|---|
| 10,181,000 B1* | 1/2019 | Vardhan | G06F 30/367 |
| 10,255,118 B2 | 4/2019 | Yu et al. | |
| 10,540,202 B1* | 1/2020 | Smaldone | G06F 9/5027 |
| 10,740,674 B2* | 8/2020 | Ambrose | G06F 9/50 |
| 2002/0040381 A1* | 4/2002 | Steiger | G06F 9/505 |
| | | | 718/102 |
| 2012/0266176 A1* | 10/2012 | Vojnovic | G06F 9/5038 |
| | | | 718/104 |
| 2013/0232495 A1* | 9/2013 | Rossbach | G06F 9/5044 |
| | | | 718/102 |
| 2017/0344882 A1* | 11/2017 | Ambrose | G06N 3/045 |
| 2018/0046903 A1 | 2/2018 | Yao et al. | |
| 2019/0114533 A1 | 4/2019 | Ng et al. | |
| 2019/0294959 A1* | 9/2019 | Vantrease | G06N 3/063 |
| 2019/0294968 A1* | 9/2019 | Vantrease | G06N 3/08 |
| 2019/0370085 A1* | 12/2019 | Gross | G06F 1/3296 |
| 2020/0057581 A1 | 2/2020 | Choi | |
| 2020/0133898 A1 | 4/2020 | Therene et al. | |
| 2020/0326766 A1* | 10/2020 | Tsirkin | G06F 9/4893 |
| 2021/0064433 A1* | 3/2021 | Nakfour | G06F 9/5027 |
| 2021/0373944 A1* | 12/2021 | Lee | G06F 9/4881 |
| 2022/0107837 A1* | 4/2022 | Youn | G06F 9/4881 |
| 2022/0114015 A1* | 4/2022 | Lee | G06N 5/04 |
| 2023/0143270 A1* | 5/2023 | Lee | G06F 9/4887 |
| | | | 718/102 |

FOREIGN PATENT DOCUMENTS

| | | |
|---|---|---|
| WO | WO 2016/195840 A1 | 12/2016 |
| WO | WO 2017/214728 A1 | 12/2017 |

OTHER PUBLICATIONS

Extended European Search Report issued Feb. 4, 2022 in counterpart European Patent Application No. 21192131.7.

* cited by examiner

LAYER-WISE SCHEDULING ON MODELS BASED ON IDLE TIMES

CROSS-REFERENCE TO RELATED APPLICATIONS

This application claims the benefit under 35 USC § 119(a) of Korean Patent Application No. 10-2020-0132759 filed on Oct. 14, 2020, in the Korean Intellectual Property Office, the entire disclosure of which is incorporated herein by reference for all purposes.

BACKGROUND

1. Field

The following description relates to an electronic device and method with scheduling.

2. Description of Related Art

As artificial intelligence (AI) technology develops, use of hardware for AI is increasing. AI may perform inference and learning through operations. Thus, various devices are being developed as hardware for the implementation of AI.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes receiving respective requests for execution of a plurality of models to be independently executed in an accelerator, and performing queuing of the respective requests and layer-wise scheduling of the plurality of models, for execution by the accelerator, based on estimated idle times for respective candidate layers of each of the plurality of models corresponding to the queued respective requests.

The performing of the layer-wise scheduling may include selecting one candidate layer, of the respective candidate layers, that has a corresponding idle time that is minimum among the estimated idle times with respect to a state of the accelerator.

The state of the accelerator may be determined based on consideration of at least one of usage information of a memory of the accelerator, a difference between a point in time at which an operation resource of the accelerator will be completed and a point in time at which a memory access resource of the accelerator will be available to start being used, or a state of a progression of each of the plurality of models.

The usage information may be information of an entire capacity, a used capacity, and/or a remaining capacity of an on-chip memory of the accelerator.

The performing of the queuing of the respective requests and the layer-wise scheduling of the plurality of models may be performed in real-time.

Each of the estimated idle times, for the respective candidate layers, may be based on an idle time of a corresponding operation resource of the accelerator and an idle time of a corresponding memory access resource of the accelerator.

The idle time of the corresponding operation resource, for each of the respective candidate layers, may be determined based on a difference between a point in time at which the corresponding operation resource completes execution of a previously scheduled layer and a point in time at which a memory access resource, for the previously scheduled layer, completed execution, an execution time of the corresponding memory access resource.

The idle time of the corresponding operation resource, with respect to each of the respective candidate layers, may occur when an execution time of the corresponding memory access resource is respectively greater than an execution time of an operation resource for a previous layer that is most recently scheduled.

The corresponding idle time of the memory access resource, with respect to each of the respective candidate layers, may be determined based on a point in time at which execution of the memory access resource, with respect to each of the respective candidate layers, is suspended due to a constraint on a size of an on-chip memory of the accelerator, and a point in time at which execution of an operation resource for a previous layer that is most recently scheduled is completed.

The performing of the layer-wise scheduling of the plurality of models based on the estimated idle times may include selecting for execution a candidate layer, from among multiple candidate layers that have a same minimum estimated idle time, that has a lowest idle time of a corresponding memory access resource.

The performing of the layer-wise scheduling of the plurality of models based on the estimated idle times may include determining whether a candidate layer, among the respective candidate layers, has had a delayed execution a preset number of other layer execution times or more, and may be based on a result of the determining selecting the candidate layer to next be executed before remaining candidate layers of the respective candidate layers.

The estimated idle times may be estimated based on consideration of multiple layers currently being executed in the accelerator.

The performing of the layer-wise scheduling of the plurality of models may be performed independently of an order of the requests being received.

Two or more of the plurality of models may have no data dependency with one another when executed in the accelerator.

An operation resource of the accelerator may be based on one or more processing elements of the accelerator, and a memory access resource of the accelerator may be based on an on-chip memory and/or an off-chip memory of the accelerator.

In one general aspect, a non-transitory computer-readable storage medium may store instructions that, when executed by a processor, cause the processor to perform one or more or all operations and methods described herein.

In one general aspect, a non-transitory computer-readable storage medium may store instructions that, when executed by a processor distinct from the accelerator, may cause the processor to perform any one, combination, or all scheduling operations and methods described herein, and cause respective executions of the plurality of candidate layers based on the scheduling using the accelerator.

In one general aspect, an electronic device includes one or more processors configured to perform, in real-time, a queuing of respective requests for execution of a plurality of models to be independently executed in an accelerator, and a layer-wise scheduling of the plurality of models, for execution by the accelerator, based on estimated idle times for respective candidate layers of each of the plurality of models corresponding to the queued respective requests.

The device may further include an off-chip memory, and the accelerator that may include an on-chip memory.

For the performing in real-time of the layer-wise scheduling, the one or more processors may be configured to select one candidate layer, of the respective candidate layers, that has a corresponding idle time that is minimum among the estimated idle times with respect to a state of the accelerator.

Each of the estimated idle times, for the respective candidate layers, may be based on an idle time of a corresponding operation resource of the accelerator and an idle time of a corresponding memory access resource of the accelerator.

The idle time of the corresponding operation resource, for each of the respective candidate layers, may be determined based on a difference between a point in time at which the corresponding operation resource completes execution of a previously scheduled layer and a point in time at which a memory access resource, for the previously scheduled layer, completed execution, an execution time of the corresponding memory access resource.

The idle time of the corresponding memory access resource, with respect to each of the respective candidate layers, may be determined based on a point in time at which an execution of the corresponding memory access resource is suspended due to a constraint on a size of an on-chip memory of the accelerator, a point in time at which execution, of an operation resource for a previous layer that is most recently scheduled, is completed.

In one general aspect, an electronic device includes a scheduler configured to queue plural requests for execution of a plurality of models to be independently executed, and perform layer-wise scheduling on the plurality of models, for execution by the accelerator, based on estimated idle times for respective candidate layers of each of the plurality of models, and the accelerator configured to execute respective layers of the plurality of models based on the performed layer-wise scheduling by the scheduler.

In one general aspect, a processor-implemented method includes performing real-time layer-wise scheduling, of a plurality of models requested for execution in an accelerator, where the real-time layer-wise scheduling is based on estimated idle times for plural independent candidate layers of the plurality of models, and where the real-time layer-wise scheduling is performed after each time a previous candidate layer has begun scheduled execution in the accelerator and candidate layers remain to be scheduled with respect to the plurality of models, and instructing the accelerator to execute one or more of the plural independent candidate layers that have lowest estimated idle times of the estimated idle times.

The method may further include queuing respective requests for execution of the plurality of models, and performing the layer-wise scheduling based on the queued respective requests, a state of the accelerator, and respective workload characteristics of the plural independent candidate layers of the plurality of models.

The estimated idle times for the plural independent candidate layers may each be based on consideration of respective operation and memory access resources for the accelerator.

Other features and aspects will be apparent from the following detailed description, the drawings, and the claims.

Figure 1A:
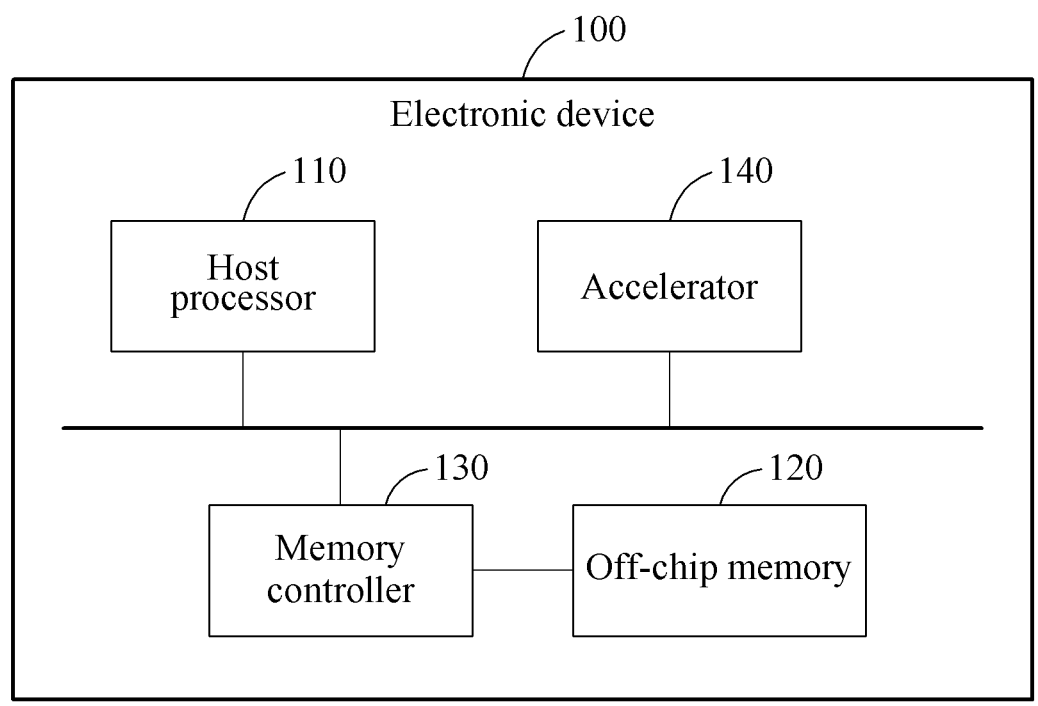
FIGS. 1a and 1b are diagrams illustrating an electronic device, according to one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Descriptions of features that are known after an understanding of the present disclosure may also be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. As further used herein, the singular forms are intended to include the plural forms as well, unless the context clearly indicates otherwise. For example articles "a," "an," and "the" are intended to include the plural forms as well, unless the context clearly indicates otherwise. It should be further understood that the terms "comprises," "includes," and "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description could cause ambiguous interpretation of the example embodiments. Hereinafter, examples will be described in detail with reference to the accompanying drawings, and like reference numerals in the drawings refer to like elements throughout.

Figure 1B:
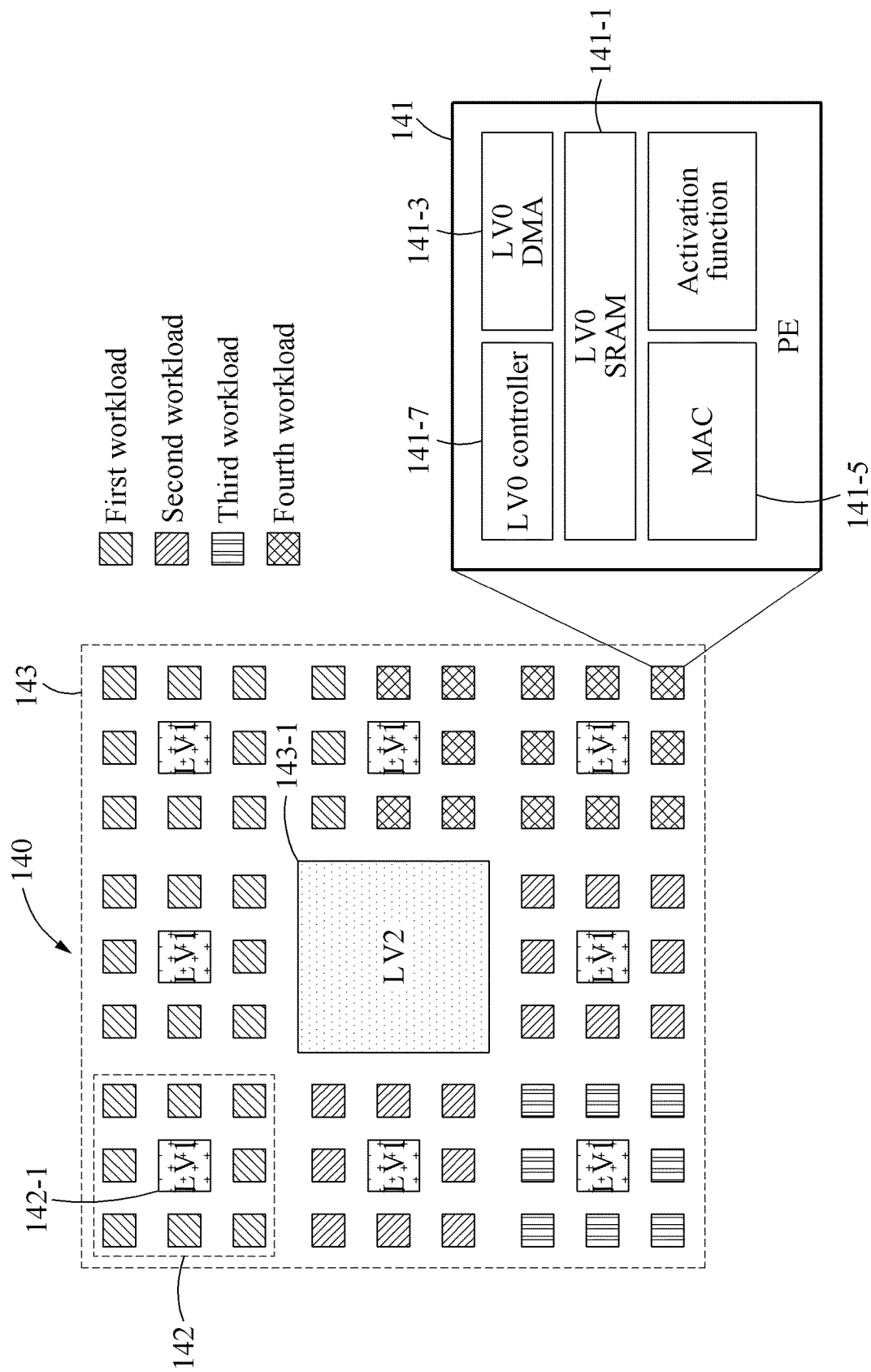

FIGS. 1a and 1b are diagrams illustrating an electronic device, according to one or more embodiments.

Referring to FIG. 1a, an electronic device 100 includes a host processor 110, an off-chip memory 120, a memory controller 130, and an accelerator 140. The host processor 110, the off-chip memory 120, the memory controller 130, and the accelerator 140 may communicate with one another through a bus, a network on a chip (NoC), a peripheral component interconnect express (PCIe), and the like in various examples.

The host processor 110 may be a device configured to control various operations of components included in the electronic device 100 and may include a central processing unit (CPU), for example. The host processor 110 may receive one or more requests for processing a neural network, for example, in the accelerator 140 and may generate respective instructions that are executable in the accelerator 140 for the received requests. A request described herein may be made for a neural network-based data inference, and for obtaining a result of the data inference by allowing the accelerator 140 to execute a neural network for object recognition, pattern recognition, computer vision, speech recognition, machine translation, machine interpretation, and the like, in various examples. The host processor 110 may transfer target inference data and particular parameters of the neural network to the accelerator 140.

The off-chip memory 120 may be a memory disposed outside the accelerator 140, and may be a dynamic random-access memory (DRAM) used as a main memory of the electronic device 100, as a non-limiting example. The off-chip memory 120 may store the target inference data and/or the parameters of the neural network to be executed in the accelerator 140, and the stored data may be transferred to the accelerator 140 for the performance of a subsequent inference. The off-chip memory 120 may also store input data for a first layer of the neural network along with the corresponding parameters of the neural network to be executed in the accelerator 140, and/or the host processor 110 may also store such input data, when the host processor 110 collects or receives information from an I/O or capturing device/component of the electronic device 100, such as a microphone or camera(s) in the example of FIG. 10, as non-limiting examples. The off-chip memory 120 may be used to store the target inference data and/or parameters in a case in which an on-chip memory in the accelerator 140 is not sufficient to execute the corresponding neural network in the accelerator 140.

The off-chip memory 120 may have a larger memory capacity than the on-chip memory in the accelerator 140. However, when executing the example neural network, a cost for access by the accelerator 140 to the off-chip memory 120 may be greater than a cost for access to the on-chip memory. Such a memory access cost may indicate an amount of power and/or time that is used for accessing a memory and then reading or writing data from or in the memory.

The accelerator 140 may be an artificial intelligence (AI) accelerator configured to execute neural networks or neural network operations according to an instruction of the host processor 110 and, through the execution, infer a resultant data, and is a separate processor distinguished from the host processor 110. The accelerator 140 may be a neural processing unit (NPU), a graphics processing unit (GPU), a tensor processing unit (TPU), or the like in various examples. The accelerator 140 is also representative of one or more accelerators 140.

The accelerator 140 may process a workload that is more effectively processed by a separate dedicated processor, for example, the accelerator 140, than by the host processor 110 used for general purposes, based on characteristics of operations of the neural network. Here, one or more processing elements (PEs) are included in the accelerator 140, and the on-chip memory may be used. The on-chip memory may be a device including a global shared buffer and/or a local buffer that are included in the accelerator 140 and is distinguished from the off-chip memory 120 disposed outside the accelerator 140. The on-chip memory may include, for example, a scratchpad memory accessible through an address space, a static random-access memory (SRAM), or the like.

The neural network may include a plurality of layers. In an example, the neural network may include an input layer, a plurality of hidden layers, and an output layer. Each of the layers may include a plurality of nodes, each of which may also be referred to as an artificial neuron, though references to a neuron or neurons, or connections between the same, are not intended to infer any relation to biological formations, but rather are merely terms of art. Each of the nodes may be a computation unit having at least one input and output, and the nodes may be connected to one another in various ways in various examples. A weight may be set for a connection between respective nodes and the weights may be adjustable or changeable, e.g., for different layers of a same neural network, or for different neural networks configured for different purposes. Further, during training, the weights may represent interim weights, with the finally trained weights being trained weights. For example, during training as a non-limiting example, respective weight may be increased, decreased, or maintained a related data value, determining an influence of the data value on a final result. In a non-limiting example, each node included in the output layer may have weighted inputs from nodes included in a previous layer. A process in which weighted data is input from a layer to a subsequent layer of the layer may be referred to as forward propagation.

In an example, when a plurality of requests are received by the host processor 110 for neural network implementations, the accelerator 140 may respectively execute the plurality of neural networks according to instructions transferred from the host processor 110. In this example, the neural networks to be executed in the accelerator 140 may have different structures and/or different weights and connections, or the same neural network may be executed several times. In an additional example, plural parallel layers of a same neural network may be requested to be executed, or executed along with plural other neural networks. However, in the case in which the neural networks are executed in the accelerator 140 based simply on the order in which the requests are received by the host processor 110, idle times may exist during which a hardware resource of the accelerator 140 is not used in the course of the respective executions due to workload characteristics of each of the neural networks. In addition, a great tail latency may occur where a request received late is significantly delayed while a previous request is processed.

To prevent such a degradation of utilization of the accelerator 140, scheduling may be desirably controlled for which neural network to execute in the accelerator 140 at specific times.

In addition, in one or more examples, the scheduling on the neural networks may be performed in layer units, which may reduce or minimize the idle time occurring during the execution. A neural network is also referred to herein as a model for the convenience of description.

FIG. 1b illustrates an example structure of the accelerator 140 configured to execute a scheduled model. The accelerator 140 may include a plurality of PEs and a multilevel memory accessible by at least one of the PEs. The multilevel memory may be a collective expression of a level (LV) 0 memory 141-1 corresponding to the on-chip memory of the accelerator 140, an LV 1 memory 142-1, and an LV 2 memory 143-1.

Referring to FIG. 1b, in an example, each PE 141 among the PEs includes an LV 0 memory 141-1, an LV 0 direct memory access (DMA) 141-3, a multiplier-accumulator (MAC) 141-5, and an LV 0 controller 141-7.

The LV 0 memory 141-1 may be a memory accessible by the corresponding PE 141. That is, each LV 0 memory 141-1 in each respective PE 141 may only be accessible by that respective PE 141.

For each PE 141, the LV0 DMA 141-3 may control input data and/or output data of the LV0 memory 141-1 based on an instruction from the LV0 controller 141-7. The LV0 DMA 141-3 may read data from the LV0 memory 141-1 or write data in the LV0 memory 141-1 based on information associated with a source, a destination, and a data size that are included in the instruction from the LV0 controller 141-7.

Here, data input to the LV 0 memory 141-1 or data output from LV 0 memory 141-1 may be monitored and/or profiled. Such monitoring and/or profiling may be performed in the LV0 DMA 141-3 or a separate hardware element. Through the monitoring and/or profiling, it is possible to verify an access cost of the LV 0 memory 141-1, usage information of the LV 0 memory 141-1, and a type of data stored in the LV0 memory 141-1. For example, each LV0 DMA 141-3 may verify what percentage is indicated as the usage information of the corresponding LV0 memory 141-1, and which workload is involved with the data stored in the corresponding LV0 memory 141-1.

The MAC 141-5 may perform an operation or computation involved with a workload assigned to the PE 141. For example, the MAC 141-5 may perform a multiply-accumulate operation on given data. In addition, the MAC 141-5 may apply an activation function to the given data. The activation function may be sigmoid, hyperbolic tangent (tanh), or a rectified linear unit (ReLU), as non-limiting examples.

Each LV0 controller 141-7 may also be a device configured to control components included in the corresponding PE 141. For example, the LV0 controller 141-7 may control the LV0 memory 141-1, the LV0 DMA 141-3, and the MAC 141-5.

The foregoing description of the illustrated PE 141 of FIG. 1b is applicable to each of the PEs included in the accelerator 140. That is, the accelerator 140 may include the PEs each performing an operation or computation independently.

In an example, each of n PEs, among all PEs, may cluster together. In this example, n is a natural number greater than 1 and less than the total number of the PEs included in the accelerator 140. That is, respective portions of the PEs included in the accelerator 140 may respectively cluster together to form plural clusters, for example, a PE cluster 142. PE cluster sizes may be the same or may vary in the accelerator 140.

PEs included in each cluster, e.g., the cluster 142, may share one LV1 memory 142-1. That is, the LV1 memory 142-1 may be accessible by the plural PEs included in the corresponding cluster 142. For example, even though operations respectively performed in a first PE and a second PE among the PEs in the cluster 142 may be different from each other, a same portion of data used for the operations may be commonly available to all PEs in the cluster 142. As this common data is stored in the LV1 memory 142-1, rather than being stored in an LV0 memory 141-1 included in each of a first PE and a second PE, the first PE and the second PE may share the common data, which may improve the efficiency of the accelerator 140. In the example of FIG. 1b, the respective LV1 memories 142-1 for each of the PEs may be arranged so each PE may access an LV1 memory 142-1 adjacent to each of the PEs.

In addition with respect to FIG. 1b, in an example, each of the memories LV1 142-1 is representative an LV1 DMA configured to monitor and/or profile data to be input to or output from the respective LV1 memories 142-1. In addition, the accelerator 140 may include respective LV1 controllers to control the respective LV1 memories 142-1 and the LV1 DMA.

In addition, an entirety 143 of the PEs may share the LV2 memory 143-1. That is, the LV2 memory 143-1 may be accessible by all the PEs included in accelerator 140. For example, there may be PEs that share a portion of data used to perform an operation, although those PEs are not clustered together to form a same cluster, among the PEs included in the accelerator 140. In this example, such PEs may not share the data through the LV1 memory 142-1, and may effectively share the common data through the LV2 memory 143-1, which may increase the efficiency of the accelerator 140. In addition with respect to FIG. 1*b*, in an example, the LV2 memory 143-1 is also representative of an LV2 DMA configured to monitor and/or profile data input to or output from the LV2 memory 143-1. In addition, accelerator 140 may include an LV2 controller to control the LV2 memory 143-1 and the LV2 DMA.

As described above, each of the PEs may access a respective LV0 memory 141-1, an LV1 memory 142-1 adjacent to each of the PEs, and the LV2 memory 143-1 of the accelerator 140, and use these memories to perform an assigned or instructed workload. The accelerator 140 may include a multilevel memory including hierarchical memories.

In addition, respective DMAs and controllers included in the accelerator 140 may be of a hierarchical multilevel type. In addition, resultant information from the monitoring and/or profiling of the respective data multilevel memories, monitoring and/or profiling data input to or output the respective memories, may be considered for the memory access cost, memory use or availability, and idle information of the accelerator 140. Accordingly, previous neural network executions by the accelerator 140 of various neural networks or network layers may be informative for estimating idle information for previously implemented or new candidate neural network layer, among a plurality of candidate neural network layers. Thus, the information of the memory accesses into memories, from memories to PEs, corresponding workloads and start and end completion times of the corresponding PEs, memory accesses from the PEs to memories, and eventual memory access to the off-chip memory 220 and/or the host processor 110 may be considered for each of the candidate layers, along with the workload characteristics, such as the number of parameters and the extent of input and output information, and type of operations to be performed for the execution of each of the candidate layers, for estimating PE and memory idle times for each of the candidate layers each time at least one resulting candidate layer is ultimately scheduled and executed, e.g., ultimately scheduled and executed after completion of a previously scheduled candidate layer.

In a non-limiting example, the PEs included in the accelerator 140 may simultaneously perform multiple workloads. One workload with a relatively greater operation amount may be assigned to a greater number of PEs (e.g., two or more clusters) and processed therein, and a second workload with a relatively less operation amount may be assigned to a smaller number of PEs (e.g., only one cluster) and processed therein. Alternatively, there may be multiple workloads being performed with an equal number of clusters for each workload.

For the convenience of description, FIG. 1*b* illustrates the non-limiting example where every eight PEs among 64 PEs cluster together to form a total of eight clusters, and three level memories are used to perform each of the four workloads. As illustrated in FIG. 1, eight PEs included in the same cluster may process different workloads. However, various numbers of PEs, workloads, and levels may be applied without limitation. The components in FIGS. 1*a* and 1*b* are also illustrative of the corresponding components of the server and electronic devices of FIGS. 9 and 10.

Figure 2:
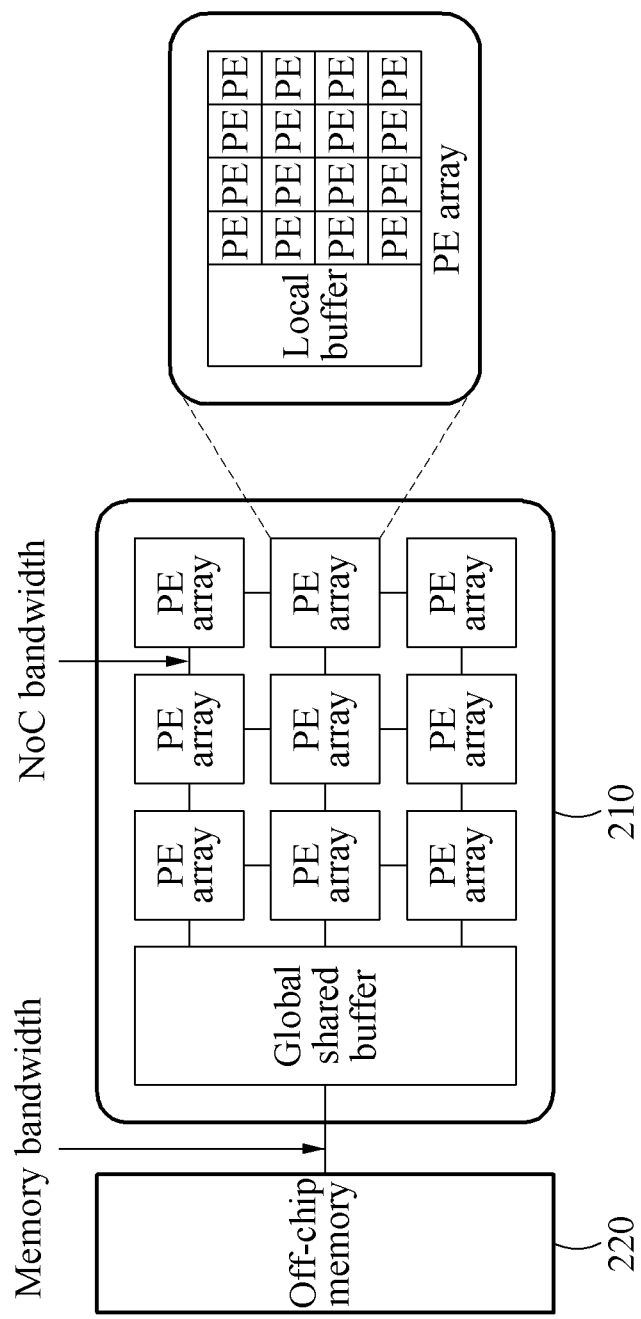
FIG. 2 is a diagram illustrating example hardware resources of an accelerator, according to one or more embodiments.

FIG. 2 is a diagram illustrating example hardware resources of an accelerator, according to one or more embodiments.

In the example of FIG. 2, illustrated are an accelerator 210 and an off-chip memory 220.

In the example, the accelerator 210 includes a global shared buffer, and a plurality of PE arrays sharing the global shared buffer. Each of the PE arrays includes a local buffer, and a plurality of PEs sharing the local buffer. The global shared buffer and the local buffer may be referred to as an on-chip memory disposed inside the accelerator 210.

To execute a model in the accelerator 210, the processes of reading data used to execute the model through memory accesses, performing operations or computations in one or more respective PEs, and storing results of the operations or computations in a memory may be performed repeatedly or iteratively, e.g., the off-chip memory 220 in addition to the respective on-chip memory.

The on-chip memory may be disposed inside the accelerator 210 and have a lower access cost than the off-chip memory 220. However, the on-chip memory may have a smaller memory capacity than the off-chip memory 220, and thus the on-chip memory may not be sufficient to store all data for processing operations in PEs. Thus, the off-chip memory 220 may be used in such a case.

To execute a model in the accelerator 210, various hardware resources may be used. For example, an operation resource (or a computation resource) based on one or more PEs and a memory access resource based on the on-chip memory and/or the off-chip memory 220 may be used.

For example, the operation resource may indicate an operation quantity that is processible in a PE and may be represented by a unit of measure, such as, for example, in floating point operations per second (FLOPS) or tera operations per second (TOPS). The memory access resource may indicate an NoC bandwidth between PE arrays and a memory bandwidth between the accelerator 210 and the off-chip memory 220, and may be represented by another unit of measure, such as, for example, gigabytes per second (GB/s). In addition, the memory access resource may indicate a memory capacity of the global shared buffer and the local buffer and be represented by a still further unit of measure, such as, for example, megabyte (MB).

In an example, the memory bandwidth may be the memory bandwidth for transferring data stored in the off-chip memory 220, which may have a relatively high capacity, to the global shared buffer, which may have a relatively low capacity. The NoC bandwidth may be for transferring the data, which has been transferred to the global shared buffer, for example, to a PE array that performs an actual operation. Thus, in general, the memory bandwidth may ultimately be smaller than the NoC bandwidth in the accelerator 210.

As noted above, models and/or layers included in each of the models may have different workload characteristics, and thus the operation resource and the memory access resource that would be used for each model or layer may differ for each model or layer. Thus, by performing scheduling based on the workload characteristics, to increase or maximally overlap times for which the memory and computation/operation resources in the accelerator 210 are used and to reduce or minimize idle times, various examples may improve an overall system performance.

In an example, for model scheduling, data dependency and the availability of the on-chip memory may be further considered.

The data dependency may indicate a computation order of sets of data intended by a design or a compiler to obtain a desired result, and a plurality of layers included in one model may be sequentially processed in a preset order. However, there may be no data dependency among a plurality of models to be processed in the accelerator 210, and thus a change in a processing order of the models may not have a significant effect. For example, after one layer included in a first model is processed, a subsequent layer of the layer may be processed or a layer of a second model to be subsequently processed may be processed. As described in the foregoing example, a processing order between the first model and the second model may change by each layer execution.

The availability of the on-chip memory may restrict the processing of the accelerator 210. The on-chip memory may be an internal memory of the accelerator 210 that is fast accessible, but may not have a memory capacity sufficient for PEs to efficiently perform a particular operation. In such a case, when using the off-chip memory 220 corresponding to an external memory of the accelerator 210, a memory access time may be considered for performing scheduling because memory access time for the off-chip memory 220 is greater than that of the on-chip memory. That is, a method of reusing intermediate data of each model in the on-chip memory of the accelerator 210 may also affect the memory access cost, and thus it may also be considered for the scheduling.

Figure 3:
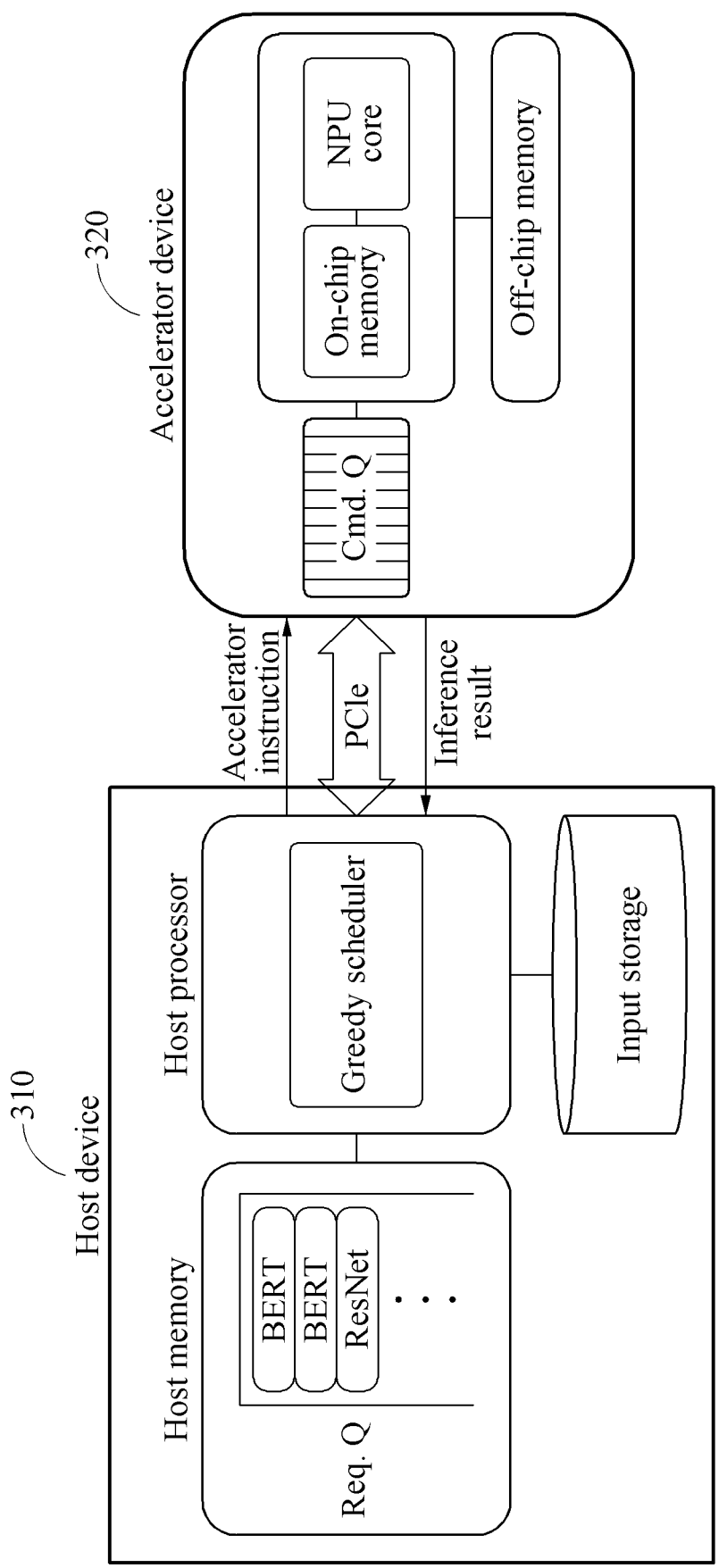
FIG. 3 is a diagram illustrating an example of layer-wise scheduling, according to one or more embodiments.

FIG. 3 is a diagram illustrating an example of layer-wise scheduling, according to one or more embodiments.

Referring to FIG. 3, a host device 310 and an accelerator device 320 that are included in an electronic device may be connected through a PCIe, and a model may be executed in the accelerator device 320 based on a schedule determined by the host device 310. Examples of the connection between the host device 310 and the accelerator device 320 are not limited to the PCIe, and other types of connection may also be applicable.

The host device 310 may include a host memory, a host processor, and an input storage. The host memory may include a request queue in which requests from a single or multiple users or functions are stored. In the request queue, execution requests for a model supported by the accelerator device 320 may be continuously accumulated. An execution request for a model described herein may refer to a request for executing the model. In the example of FIG. 3, BERT and ResNet may refer to different models for which execution requests are made from a user or function of the electronic device.

The host processor may include a greedy scheduler, for example, configured to perform scheduling on a layer to be executed subsequently among models corresponding to requests stored in the request queue. The greedy scheduler will be simply referred to as a scheduler for the convenience of description.

The scheduler may be called each time execution of a scheduled layer is completed in the accelerator device 320 and the scheduler may perform scheduling for a layer of that model or another model that minimizes an idle time of the accelerator device 320 at a corresponding time. That is, the scheduler may calculate or estimate an idle time occurring when a candidate layer, which is a target for the scheduling, in each of a plurality of models corresponding to available user requests is executed at a point in time at which the scheduler is called, perform scheduling on a selected layer with a minimal or minimum idle time, and allow the layer to be executed in the accelerator device 320. In an example set of models, there may be no data dependency between the models, and thus the scheduler may perform layer-wise scheduling on the different models independently of an order of requests. As described above, as the scheduler calculates or estimates an idle time of the accelerator device 320 that occurs when each candidate layer is selected each time the execution of each layer is completed, and performs scheduling on a layer with a minimal or minimum idle time, it is possible to increase or maximize throughput and performance of the accelerator device 320 even through runtime scheduling that is based on a portion of layers without considering the execution of all the layers included in each model. In addition, even though the scheduler is called each time a layer to be executed in the accelerator device 320 is switched (that is, content switching), real-time scheduling and support the scalability to a plurality of models may be provided in various examples.

In an example, a subsequent accelerator state may be tracked and recorded, and the scheduler may perform scheduling based on the accelerator state. Such as discussed above with respect to the memory and operation resources, an accelerator state described herein may include at least one of usage information of a memory included in an accelerator (e.g., an entire capacity, a used capacity, and/or a remaining capacity of an on-chip memory in MB units of measure), a difference between a point in time at which an operation resource of the accelerator is most recently used and a point in time at which a memory access resource of the accelerator starts being used (e.g., in cycles unit of measure), or a state of a progression of each of models (e.g., represented by an n-th layer, considering the presence of data dependency among layers included in a same model). Hereinafter, scheduling based on such an accelerator state will be described in greater detail with reference to FIGS. 4 and 5.

In addition, the scheduler may calculate/estimate a potential probability that an idle time will occur in the future based on a current state of an on-chip memory, and perform scheduling based on a determined influence of the selection of a layer made at a current time on future layer scheduling.

The scheduler may perform the scheduling as described above until the execution of all models stored in the request queue is completed.

The input storage may include the various model parameters for the multiple models to be executed, as well as the respective input data that are targets for respective inferences. An input data may refer to data to be initially input to a model, or output data from one or more layers of a model that have been previously executed, as non-limiting examples.

The host device 310 may transfer, to the accelerator device 320, an accelerator instruction as to which layer is to be performed at which point in time determined by the scheduler. The accelerator device 320 may then execute a layer according to the accelerator instruction and return an inference result of a model (or layer of the model) for which the layer execution is completed to the host device 310.

As described above, various example embodiments may effectively implement a runtime scheduler without the addition of separate dedicated or auxiliary hardware for performing layer-wise runtime scheduling.

In one non-limiting example, the host devices of FIGS. 1a-3 and 9-10 may be the same host devices, the accelerators or accelerator devices of FIGS. 1a-3 and 9-10 may be the same accelerator or accelerator devices, and the scheduler of FIGS. 1a-3 and 9-10 may be the same schedulers, noting that alternatives also exist.

Figure 4:
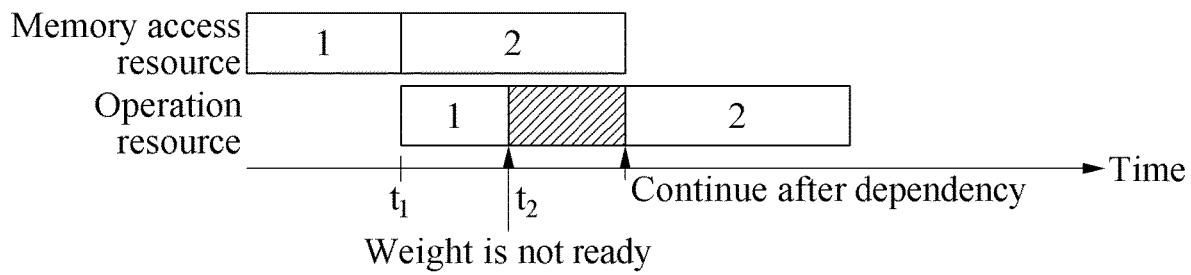
FIGS. 4 and 5 are diagrams illustrating examples of an idle time, according to one or more embodiments.
Figure 5:
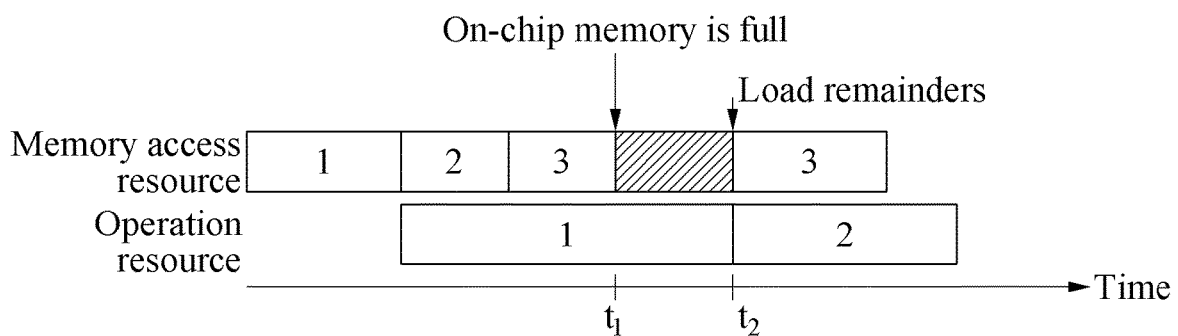

FIGS. 4 and 5 are diagrams illustrating examples of an idle time, according to one or more embodiments.

For an operation to be performed in an operation resource, a process of reading data that is a target for the operation may need to be performed first through a memory access resource. The memory access resource and the operation resource may operate in parallel. Thus, it is possible to reduce an unnecessary idle time by reading in advance data for a subsequent operation through the memory access resource while an operation is being performed in the operation resource. As such an idle time of the memory access resource and the operation resource decreases, the utilization of an accelerator may be improved, and thus performance may be improved.

FIG. 4 illustrates an example of an idle time of the operation resource. In the example of FIG. 4, "1" indicates a scheduled first layer, which is a previous layer most recently scheduled, and "2" indicates a second layer to be executed after the execution of the first layer is completed, and which is a candidate layer target for scheduling.

Referring to FIG. 4, when data of the first layer is loaded through the memory access resource, an operation on the first layer may be performed in the operation resource and memory access to the second layer, to be executed subsequently, may be started in the memory access layer. Here, when a time for the memory access to the second layer is greater than a time for the operation on the first layer, the memory access to the second layer may not be completed and model parameters and the like for an operation on the second layer may not be sufficiently prepared, and thus the operation on the second layer may not be immediately or timely performed even when the operation on the first layer in the operation resource is terminated. Thus, an idle time may occur until the memory access to the second layer is completed. That is, an idle time of the operation resource may occur when a time for executing memory access to a candidate layer, which is a target for scheduling, is greater than a time for executing an operation of a most recently scheduled previous layer in the operation resource.

In the example of FIG. 4, a scheduler may determine an idle time of the operation resource based on a difference between a point in time $t_2$ at which the operation resource is most recently) executed for a previous layer and a point in time $t_1$ at which the memory access resource is most recently executed, and on an execution time for which the memory access resource is executed for a candidate layer, which is a target for scheduling. For example, the scheduler may calculate the idle time of the operation resource by subtracting the difference between the time $t_1$ and the time $t_2$ from the execution time of the memory access resource for each candidate layer.

FIG. 5 illustrates an example of an idle time of the memory access resource. In the example of FIG. 5, "1" indicates a scheduled first layer, "2" indicates a second layer, which is a previous layer that is the most recently scheduled layer, and "3" indicates a third layer to be executed after the execution of the second layer is completed, as a candidate layer target for scheduling.

Referring to FIG. 5, when data of the first layer is loaded through the memory access resource, an operation on the first layer may be performed in the operation layer, and then the memory access resource may perform data loading on the second layer. Here, the memory access resource may perform data loading on subsequent layers within an available capacity of an on-chip memory due to a limited size of the on-chip memory. In the example of FIG. 5, when a time for the operation on the first layer is greater than an execution time of the memory access resource for a subsequent layer (e.g., the second layer and the third layer), and the on-chip memory is full and a point in time $t_1$ at which further data loading is not possible is reached, an idle time of the memory access resource may occur. Here, when the operation on the first layer is completed in the operation resource at a point in time $t_2$, data associated with the operation on the first layer may be removed from the on-chip memory, and the suspended execution of the memory access resource may be resumed.

The scheduler may determine an idle time of the memory access resource based on a point in time $t_1$ at which the execution of the memory access resource for each candidate layer, which is a target for scheduling, is suspended due to a limited size of the on-chip memory of the accelerator and a point in time $t_2$ at which the execution of the operation resource for a previous layer that is most recently scheduled is completed. For example, the scheduler may calculate, as the idle time of the memory access resource, a difference between the time $t_1$ and the time $t_2$. In addition, when calculating the idle time of the memory access resource, the scheduler may also use an accelerator state described above.

In an example, the scheduler may perform scheduling on a selected layer having a minimum sum of the idle time of the memory access resource and the idle time of the operation resource, among the candidate layers that are the targets for the scheduling for a plurality of models. In this example, when there are a plurality of candidate layers having the same minimum sum of the idle time of the memory access resource and the idle time of the operation resource, the scheduler may perform the scheduling on a selected layer having a minimum idle time of the memory access resource, for example. That is, the scheduling may be performed preferentially on a layer at which a difference between a point in time at which the operation resource of the accelerator is most recently used and a point in time at which the memory access resource starts being used is maintained at a similar level to an idle time of the memory access resource that occurs by the on-chip memory. Through this, it is possible to reduce or minimize an idle time that may occur in a next scheduling.

Figure 6:
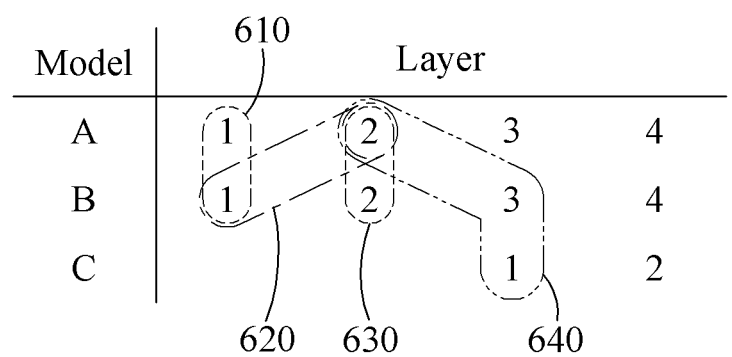
FIGS. 6 and 7 are diagrams illustrating examples of layer-wise scheduling, according to one or more embodiments.
Figure 7:
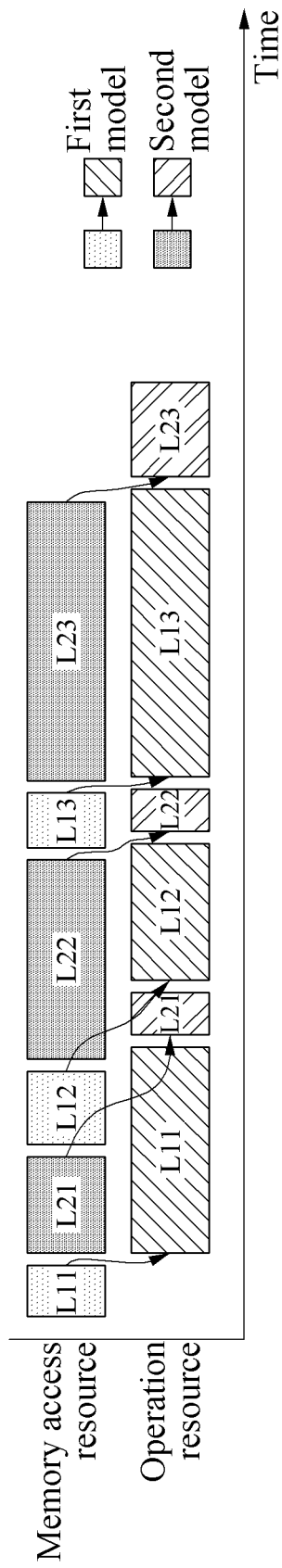

FIGS. 6 and 7 are diagrams illustrating examples of layer-unit scheduling, according to one or more embodiments.

FIG. 6 illustrates an example of how layer-wise scheduling is performed sequentially. In the example of FIG. 6, it is assumed for the convenience of description that a model C is additionally requested while layer-wise scheduling is being performed on models A and B, and thus, layer-wise scheduling is now performed on the models A, B, and C.

Referring to FIG. 6, the scheduling is performed first on the models A and B. A scheduler may perform scheduling on a first layer of the model A that has a minimum idle time among candidate layers 610 (e.g., respective first layers of the models A and B) that are a target for the scheduling in the models A and B. When the scheduler is called after the first layer of the model A is executed in an accelerator, the scheduler may perform scheduling on a first layer of the model B that has a minimum idle time among candidate layers 620 (e.g., a second layer of the model A and the first layer of the model B) which are a target for the scheduling in the models A and B. Subsequently, when the scheduler is called after the first layer of the model B is executed, the scheduler may perform scheduling on a second layer of the model B among candidate layers 630 (e.g., respective second layers of the models A and B) which are a target for the scheduling in the models A and B. Subsequently, when the scheduler is called after the second layer of the model B is executed, the scheduler may perform the layer-wise scheduling on the models A, B, and C including the model C, which is additionally requested. For example, the scheduler may perform scheduling on a layer having a minimum idle time among candidate layers 640 (e.g., the second layer of the model A, a third layer of the model B, and a first layer of the model C) which are a target for the scheduling in the models A, B, and C. Through such runtime scheduling, scalability to multiple models may be supported.

In some case, due to a great idle time of the accelerator for a certain candidate layer, the candidate layer may not be selected by the scheduler. In such a case, a latency of a model in which the candidate layer is included may increase greatly. To prevent this, when there is a layer for which execution is delayed a preset number of times or more among candidate layers of a plurality of models, the scheduler may perform scheduling on the layer and allow the layer to be forced to be executed. Through this, it is possible to effectively manage a latency of the accelerator.

Although it is illustrated in FIG. 6 that each model has a single candidate layer, each model may have a plurality of candidate layers as needed. That is, a window to which layer-wise scheduling is to be applied may set to include a plurality of candidate layers. For example, in a case in which the size of a window corresponds to three layers, candidate layers may be layers 1, 2, and 3 of the model A and layers 1, 2, and 3 of the model B. In this example, from among various combinations of these candidate layers, a layer with a minimum idle time may be selected and scheduling may be performed on the selected layer. Even in this case, in the same model, a layer order may be restricted due to data dependency. Thus, various layer execution combinations that reduces or minimizes an idle time may be considered.

FIG. 7 illustrates an example of how layer-wise scheduling is performed on models with different workload characteristics. In the example of FIG. 7, a first model may have a workload characteristic representing an operation cost being greater than a memory access cost, and a second model may have a workload characteristic representing the memory access cost being greater than the operation cost.

Referring to FIG. 7, a first layer L11 of the first model with the relatively less memory access cost is allocated to a memory access resource, and a memory access operation associated with the layer L11 is performed. When the memory access operation is terminated, the layer L11 is allocated to an operation resource and a computation operation associated with the layer L11 is performed, and a first layer L21 of the second model is allocated to the memory access resource and a memory access operation associated with the layer L21 is performed. When the memory access operation associated with the layer L21 is terminated during the computation operation associated with the layer L11, a second layer L12 of the first model is subsequently allocated to the memory access resource. Thus, it is possible to prevent an idle time from occurring in the memory access resource. The layer-wise scheduling may be performed on up to a last layer of each of the first model and the second model in a similar way as described above.

As described above, a degree of usage of each resource may differ for each layer, and thus the scheduler may allocate two layers with different workloads among layers included in each of the first model and the second model to the operation resource and the memory access resource of an accelerator, respectively. For example, while one layer included in the first model is being allocated to the operation resource of the accelerator, the scheduler may allocate, to the memory access resource of the accelerator, a subsequent layer of the first model or a layer of the second model needed to be subsequently processed. In this example, the layer of the first model to be allocated to the operation resource may have a workload characteristic different from that of the subsequent layer of the first model or the layer of the second model to be allocated to the memory access resource.

As described, the scheduler may perform layer-wise scheduling on the first model and the second model based on a workload characteristic of each layer of the first model and the second model and a hardware resource of the accelerator. Thus, idle times may be minimized or reduced from occurring in each resource and the utilization of an accelerator. The scheduler may perform scheduling to change an execution order to a layer level between models independent of each other, or another equivalent operation unit (e.g., residual block, inception module, etc.)

Figure 8:
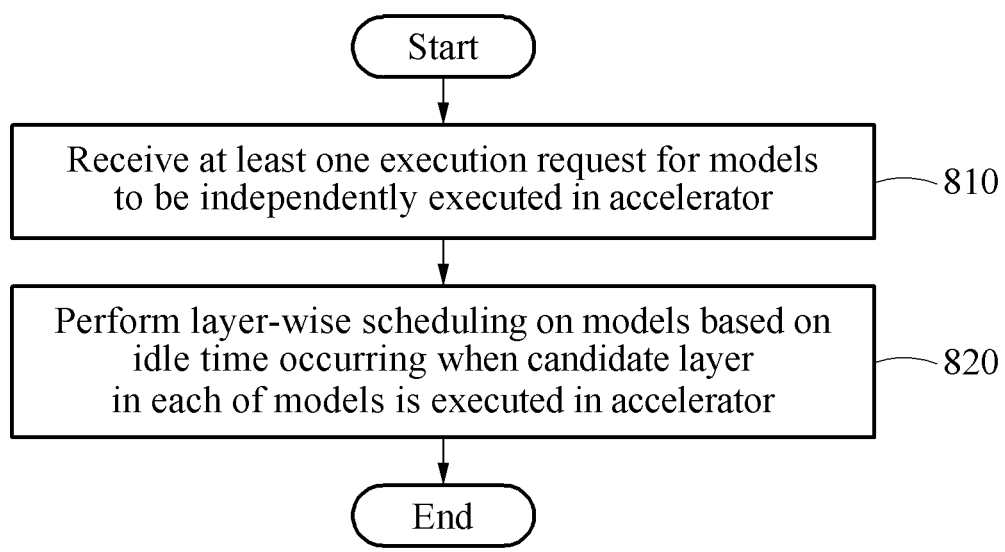
FIG. 8 is a flowchart illustrating a scheduling method, according to one or more embodiments.

FIG. 8 is a flowchart illustrating a scheduling method, according to one or more embodiments.

Referring to FIG. 8, in operation 810, a scheduler receives one or more execution requests for a plurality of models to be independently executed in an accelerator. In operation 820, the scheduler performs layer-wise scheduling on the models based on idle times for a candidate layer, which is a target for the scheduling, in each of the models if executed in the accelerator.

In an example, the scheduler may perform such layer-unit scheduling that selects a layer with a minimum idle time from among candidate layers of the models, and thus perform optimized scheduling that minimizes or reduces an idle time independently of an order of user or function requests. In this example, the scheduler may be called for each time of the execution of each layer.

The above discussions with respect to FIGS. 1*a* through 7 are applicable to the discussion of FIG. 8, and thus, provide more detailed descriptions of the operations of FIG. 8.

Figure 9:
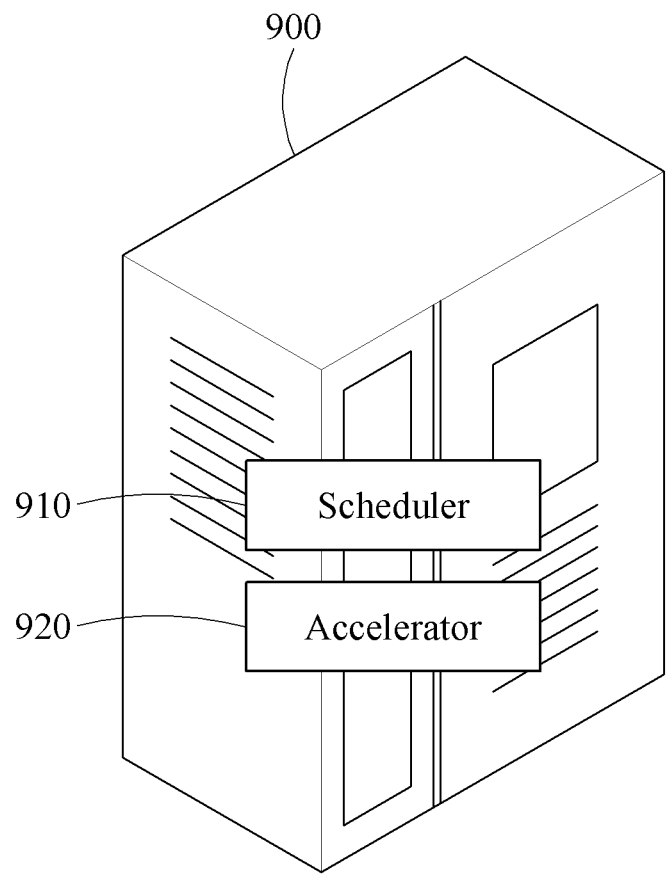
FIGS. 9 and 10 are diagrams illustrating example electronic devices, according to one or more embodiments.
Figure 10:
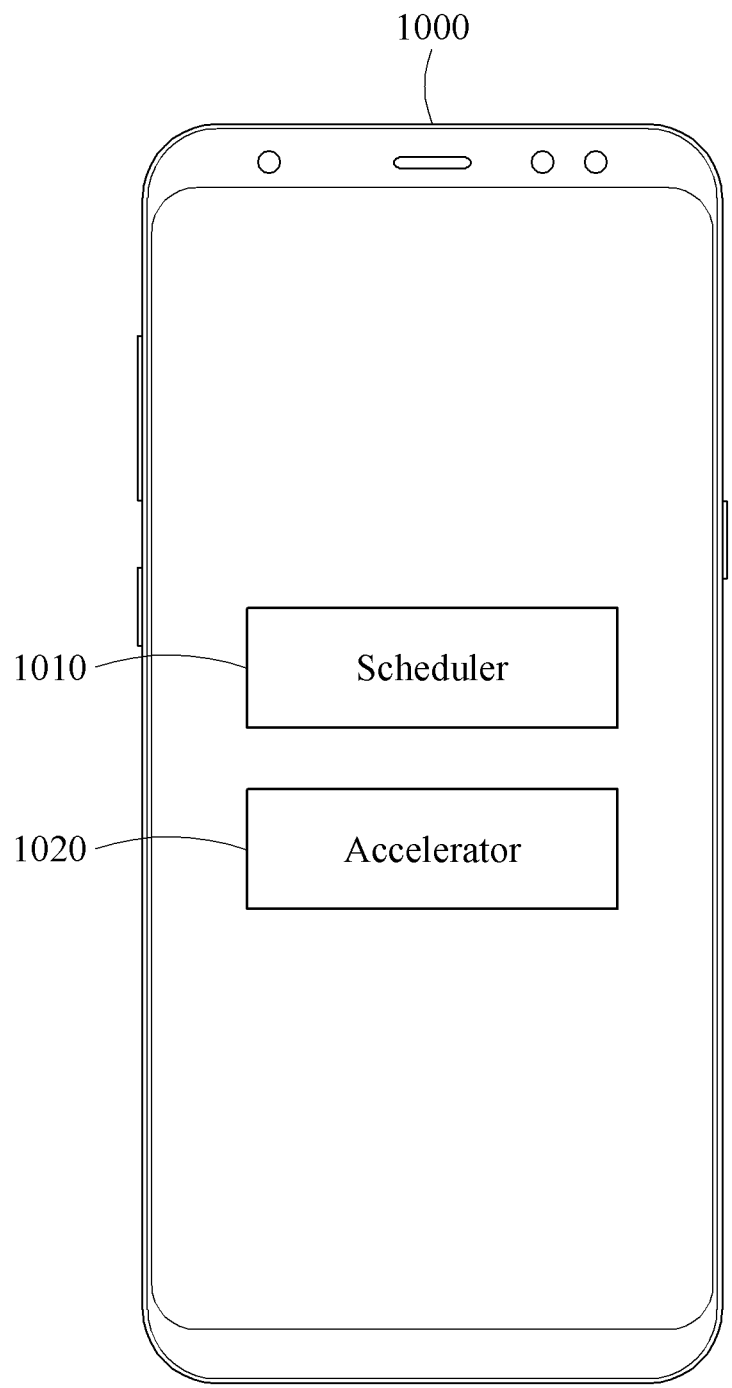

FIGS. 9 and 10 are diagrams illustrating example electronic devices, according to one or more embodiments. The above discussions with respect to FIGS. 1*a* through 8 are also applicable to the discussion of FIGS. 9 and 10, and thus, detailed descriptions of the same will not be repeated for expediency of explanation.

Referring to FIG. 9, an electronic device may be a server 900, as a non-limiting example.

The server 900 may be a separate device distinguished from an example user terminal, or other electronic device, that is controlled by a user, and may communicate with one or more such user terminals through a wired and/or wireless network. The server 900 may receive requests that are simultaneously (or soon in time, e.g., with overlapping in time execution and/or execution requests) transmitted from multiple users through their user terminals. The server 900 may also receive requests that are transmitted from a same user from multiple user terminals of the user. Through a scheduler 910, the server 900 may perform layer-wise scheduling on a plurality of models to be executed in an accelerator 920. The accelerator 920 is representative of one or two or more accelerators 920. The accelerator 920 may execute the models based on the scheduling and determine inference results. The server 900 may then return the inference results to corresponding user terminals. A user terminal (or electronic device) described herein may include any or any combination of any two or more of, for example, a computing device such as a smartphone, a personal computer (PC), a tablet PC, and a laptop, a wearable device such as a smart watch and smart eyeglasses, a home appliance such as a smart speaker, a smart TV, and/or a smart refrigerator, and other devices such as a smart vehicle, a smart kiosk, and an Internet of things (IoT) device. In addition, an example exists where the server operation is performed by one of such electronic devices that are in communication with each other and model execution requests may be received from each of the other electronic devices as well as for the one such electronic device.

Referring to FIG. 10, an electronic device may be embodied as a user terminal 1000. Although the user terminal 1000 is illustrated as a smartphone in FIG. 10 for the convenience of description, any device that is controlled by or implemented for a user may be applicable without limitation. For example, the user terminal may be any of the electronic devices discussed with respect to FIG. 9. The user terminal 1000 may obtain requests directly from a user or functions of the user terminal 1000 initiated by actions or inactions of the user, and perform scheduling on models to be executed in an accelerator 1020 by a scheduler 1010. The accelerator 1010 is representative of one or two or more accelerators 1010. The accelerator 1020 may execute the models based on the scheduling and determine inference results.

The server 900 of FIG. 9 and the user terminal 1000 of FIG. 10 are both also representative of respectively including any one or any combination of any two or more, or all, components described above with respect to FIGS. 1a-8.

The host processors, host devices, schedulers, memory controllers, off-chip memory, accelerators, electronic devices, user terminals, and other devices, apparatuses, units, modules, and components described herein with respect to FIGS. 1a-10 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1a-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method, the method comprising:
   receiving respective requests for execution of a plurality of models to be independently executed in an accelerator;
   performing queuing of the respective requests and layer-wise scheduling of the plurality of models, for execution by the accelerator, based on estimated idle times for respective candidate layers of each of the plurality of models corresponding to the queued respective requests; and
   executing respective layers of the plurality of models based on the performed layer-wise scheduling,
   wherein the performing of the layer-wise scheduling of the plurality of models based on the estimated idle times includes determining whether a candidate layer, among the respective candidate layers, has had a delayed execution a preset number of other layer execution times or more, and based on a result of the determining, selecting the candidate layer to next be executed before remaining candidate layers of the plurality of candidate layers.

2. The method of claim 1, wherein the performing of the layer-wise scheduling comprises:
   selecting one candidate layer, of the respective candidate layers, that has a corresponding idle time that is minimum among the estimated idle times with respect to a state of the accelerator.

3. The method of claim 2, wherein the state of the accelerator is determined based on consideration of at least one of:
   usage information of a memory of the accelerator;
   a difference between a point in time at which an operation resource of the accelerator will be completed and a point in time at which a memory access resource of the accelerator will be available to start being used; or
   a state of a progression of each of the plurality of models.

4. The method of claim 3, wherein the usage information is information of an entire capacity, a used capacity, and/or a remaining capacity of an on-chip memory of the accelerator.

5. The method of claim 1, wherein the performing of the queuing of the respective requests and the layer-wise scheduling of the plurality of models are performed in real-time.

6. The method of claim 1, wherein each of the estimated idle times, for the respective candidate layers, is based on an idle time of a corresponding operation resource of the accelerator and an idle time of a corresponding memory access resource of the accelerator.

7. The method of claim 6, wherein the idle time of the corresponding operation resource, for each of the respective candidate layers, is determined based on:
   a difference between a point in time at which the corresponding operation resource completes execution of a previously scheduled layer and a point in time at which a memory access resource, for the previously scheduled layer, completed execution; and
   an execution time of the corresponding memory access resource.

8. The method of claim 6, wherein the idle time of the corresponding operation resource, with respect to each of the respective candidate layers, occurs when an execution time of the corresponding memory access resource is respectively greater than an execution time of an operation resource for a previous layer that is most recently scheduled.

9. The method of claim 6, wherein the corresponding idle time of the memory access resource, with respect to each of the respective candidate layers, is determined based on:
   a point in time at which execution of the memory access resource, with respect to each of the respective candidate layers, is suspended due to a constraint on a size of an on-chip memory of the accelerator; and
   a point in time at which execution of an operation resource for a previous layer that is most recently scheduled is completed.

10. The method of claim 1, wherein the performing of the layer-wise scheduling of the plurality of models based on the estimated idle times includes selecting for execution a candidate layer, from among multiple candidate layers that have a same minimum estimated idle time, that has a lowest idle time of a corresponding memory access resource.

11. The method of claim 1, wherein the estimated idle times are estimated based on consideration of multiple layers currently being executed in the accelerator.

12. The method of claim 1, wherein the performing of the layer-wise scheduling of the plurality of models is performed independently of an order of the requests being received.

13. The method of claim 1, wherein two or more of the plurality of models will have no data dependency with one another when executed in the accelerator.

14. The method of claim 1, wherein an operation resource of the accelerator is based on one or more processing elements of the accelerator, and a memory access resource of the accelerator is based on an on-chip memory and/or an off-chip memory of the accelerator.

15. A non-transitory computer-readable storage medium storing instructions that, when executed by a processor, cause the processor to perform the method of claim 1.

16. A non-transitory computer-readable storage medium storing instructions that, when executed by a processor distinct from the accelerator, causes the processor to perform the method of claim 1 and causes respective executions of the plurality of candidate layers based on the scheduling using the accelerator.

17. An electronic device, comprising:
one or more processors configured to:
  perform, in real-time,
    a queuing of respective requests for execution of a plurality of models to be independently executed in an accelerator, and
    a layer-wise scheduling of the plurality of models, for execution by the accelerator, based on estimated idle times for respective candidate layers of each of the plurality of models corresponding to the queued respective requests; and
  execute respective layers of the plurality of models based on the performed layer-wise scheduling,
wherein, for the performing of the layer-wise scheduling of the plurality of models based on the estimated idle times, the one or more processors are configured to determine whether a candidate layer, among the respective candidate layers, has had a delayed execution a preset number of other layer execution times or more, and based on a result of the determining, select the candidate layer to next be executed before remaining candidate layers of the plurality of candidate layers.

18. The device of claim 17, further comprising:
an off-chip memory; and
the accelerator, which includes an on-chip memory.

19. An electronic device comprising:
a scheduler configured to queue plural requests for execution of a plurality of models to be independently executed, and perform layer-wise scheduling on the plurality of models, for execution by the accelerator, based on estimated idle times for respective candidate layers of each of the plurality of models; and
the accelerator configured to execute respective layers of the plurality of models based on the performed layer-wise scheduling by the scheduler,
wherein, for the performing of the layer-wise scheduling of the plurality of models based on the estimated idle times, the scheduler is configured to determine whether a candidate layer, among the respective candidate layers, has had a delayed execution a preset number of other layer execution times or more, and based on a result of the determining, select the candidate layer to next be executed before remaining candidate layers of the plurality of candidate layers.

20. A processor-implemented method, comprising:
performing real-time layer-wise scheduling, of a plurality of models requested for execution in an accelerator,
  where the real-time layer-wise scheduling is based on estimated idle times for plural independent candidate layers of the plurality of models, and
  where the real-time layer-wise scheduling is performed after each time a previous candidate layer has begun scheduled execution in the accelerator and candidate layers remain to be scheduled with respect to the plurality of models; and
instructing the accelerator to execute one or more of the plural independent candidate layers that have lowest estimated idle times of the estimated idle times,
wherein the performing of the real-time layer-wise scheduling of the plurality of models based on the estimated idle times includes determining whether a candidate layer, among the respective candidate layers, has had a delayed execution a preset number of other layer execution times or more, and based on a result of the determining, selecting the candidate layer to next be executed before remaining candidate layers of the plurality of candidate layers.

21. The method of claim 20, further comprising queuing respective requests for execution of the plurality of models, and performing the real-time layer-wise scheduling based on the queued respective requests, a state of the accelerator, and respective workload characteristics of the plural independent candidate layers of the plurality of models.

* * * * *